(12) United States Patent
Minor

(10) Patent No.: US 6,899,820 B2
(45) Date of Patent: May 31, 2005

(54) FLUOROCARBON, OXYGENATED AND NON-OXYGENATED LUBRICANT, AND COMPATIBILIZER COMPOSITION, AND METHOD FOR REPLACING REFRIGERATION COMPOSITION IN A REFRIGERATION SYSTEM

(75) Inventor: Barbara Haviland Minor, Elkton, MD (US)

(73) Assignee: E. I. Du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/460,037

(22) Filed: Jun. 9, 2003

(65) Prior Publication Data

US 2004/0041122 A1 Mar. 4, 2004

Related U.S. Application Data

(60) Provisional application No. 60/387,357, filed on Jun. 10, 2002.

(51) Int. Cl.[7] ................................................ C09K 5/00
(52) U.S. Cl. ............................. 252/67; 252/68; 252/69; 508/110; 508/111
(58) Field of Search ............................. 252/67, 68, 69; 508/110, 111; 208/19; 408/244, 297

(56) References Cited

U.S. PATENT DOCUMENTS

| | | | |
|---|---|---|---|
| 4,975,212 A | 12/1990 | Thomas et al. | 252/54 |
| 5,154,846 A | 10/1992 | Thomas et al. | 252/68 |
| 5,205,357 A | 4/1993 | Terral | 166/117.5 |
| 5,254,280 A | 10/1993 | Thomas et al. | 282/68 |
| 5,417,872 A | 5/1995 | Fukuda et al. | 252/56 |
| 5,498,356 A | 3/1996 | Kamakura et al. | 252/50 |
| 5,547,593 A * | 8/1996 | Sanechika et al. | 508/207 |
| 5,801,132 A | 9/1998 | Kaneko et al. | 508/579 |
| 6,251,300 B1 | 6/2001 | Takigawa et al. | 252/67 |
| 6,379,581 B1 | 4/2002 | Kamakura et al. | 252/68 |
| 6,516,837 B2 | 2/2003 | Thomas et al. | 141/67 |
| 2002/0013233 A1 * | 1/2002 | Corr et al. | 508/405 |

FOREIGN PATENT DOCUMENTS

| | | | |
|---|---|---|---|
| EP | 0 612 839 A1 * | 2/1994 | ........ C10M/169/04 |
| EP | 0406433 B1 | 3/1997 | |
| EP | 0784090 A1 | 7/1997 | |
| JP | 05025468 A | 2/1993 | |
| JP | 05060406 A | 3/1993 | |
| JP | 07097587 A | 4/1995 | |

OTHER PUBLICATIONS

PCT Notification of Transmittal of the International Search Report dated Sep. 17, 2003.

* cited by examiner

Primary Examiner—Mark Kopec
Assistant Examiner—Eisa Elhilo
(74) Attorney, Agent, or Firm—Mark A. Edwards; Chyrrea J. Sebree

(57) ABSTRACT

The present invention relates to refrigerant compositions comprising a fluorocarbon, an oxygenated lubricant, a non-oxygenated lubricant, and a compatibilizer. The present invention further relates to methods for replacing a chlorofluorocarbon and/or hydrochlorofluorocarbon and a non-oxygenated lubricant composition with a fluorocarbon and an oxygenated lubricant composition in a compression refrigeration system without flushing residual non-oxygenated lubricant from the system.

4 Claims, No Drawings

FLUOROCARBON, OXYGENATED AND NON-OXYGENATED LUBRICANT, AND COMPATIBILIZER COMPOSITION, AND METHOD FOR REPLACING REFRIGERATION COMPOSITION IN A REFRIGERATION SYSTEM

CROSS REFERENCE TO RELATED APPLICATION

This application claims the priority benefit of U.S. Provisional Application No. 60/387,357, filed Jun. 10, 2002.

FIELD OF THE INVENTION

The present invention relates to refrigerant compositions comprising a fluorocarbon, an oxygenated lubricant, a non-oxygenated lubricant, and a compatibilizer. The present invention further relates to methods for replacing a chlorofluorocarbon or hydrochlorofluorocarbon and a non-oxygenated lubricant composition with a fluorocarbon and oxygenated lubricant composition in a compression refrigeration system without flushing residual non-oxygenated lubricant from the system.

BACKGROUND

Over the course of the last twenty (20) years it has been debated whether the release of chlorofluorocarbons (CFCs) into the atmosphere has effected the stratospheric ozone layer. As a result of this debate and international treaties, the refrigeration and air-conditioning industries have been weaning themselves from the use of CFCs and hydrochlorofluorocarbons (HCFCs). Presently, the industries are transitioning towards the use of hydrofluorocarbons (HFCs) having zero ozone depletion potential, as well as other fluorocarbon refrigerants not containing chlorine. Notably, this transition to HFCs necessitated the advent of a new class of lubricants because of the immiscibility of non-oxygenated conventional lubricants, such as mineral oil, alkylbenzene, and poly-α-olefin, with HFC refrigerants.

As a result of the transition from CFC and HCFC to HFC and other fluorocarbon refrigerants in vapor compression refrigeration systems, many CFC and/or HCFC based systems currently installed in the field will require retrofit. However, the non-oxygenated conventional compressor lubricants used with CFCs and HCFCs are not miscible with HFC refrigerants under refrigeration system operating conditions. While attempts have been made to use non-oxygenated and relatively non-polar conventional lubricants with relatively polar hydrofluorocarbon refrigerants in refrigertion systems, the lack of solubility of the HFC refrigerant in the non-oxygenated conventional lubricant renders this combination unsuitable for use in refrigeration sytems due to the presence of the highly viscous, immiscible, non-oxygenated lubricant in non-compressor zones of a refrigeration system. This incomparable combination also causes an undesirable coating of the non-compressor zones of a refrigeration system with the non-oxygenated lubricant if non-oxygenated lubricant is not thoroughly flushed from the system during retrofit. The presence of residual non-oxygenated lubricant in a vapor compression system can form a second phase, particularly in the evaporator and condenser, which can interfere with heat transfer and result in reduced system energy efficiency and capacity. Therefore, most compression refrigeration systems require costly and time-consuming flushing to remove non-oxygenated conventional lubricants and replace them with lubricants which are miscible with HFCs, such as polyol ester (POE), polyalkylene glycol (PAG) and polyvinyl ether (PVE) lubricants.

Accordingly, there exists a need and an opportunity to resolve this solubility problem so that the refrigeration industry may retrofit systems without costly and time-consuming flushing to entirely remove conventional lubricants. The present invention satisfies this need of the industry.

SUMMARY

The present invention is directed to refrigerant and lubricant compositions containing a compatibilizer that satisfies the refrigeration and air-conditioning industry's problem of insolubility between non-oxygenated conventional compression refrigeration lubricants and hydrofluorocarbon and oxygenated lubricant refrigerant compositions.

The present invention includes refrigerant compositions comprising: (a) a fluorocarbon; (b) an oxygenated lubricant selected from the group consisting of polyol esters, polyalkylene glycols and polyvinyl ethers; (c) a non-oxygenated lubricant selected from the group consisting of paraffins, napthenes, aromatics and poly-α-olefins; and (d) a compatibilizer. The compatibilizer increases the solubility of residual non-oxygenated lubricant in fluorocarbon and oxygenated lubricant refrigerant compositions in the coldest portions of a compression refrigeration apparatus, which eliminates the need for flushing residual non-oxygenated lubricant during retrofit.

The present invention is also directed to methods for replacing a first refrigerant composition comprising a chlorofluorocarbon and/or hydrochlorofluorocarbon and a non-oxygenated lubricant with a second refrigerant composition comprising a fluorocarbon and an oxygenated lubricant in a compression refrigeration system without removing residual non-oxygenated lubricant from said system, comprising: (a) removing essentially all said first composition from the system; (b) leaving residual non-oxygenated lubricant in said system following said removing; and (c) adding to said system said second composition and a compatibilizer, wherein: said non-oxygenated lubricant is selected from the group consisting of paraffins, napthenes, aromatics and poly-α-olefins; and said oxygenated lubricant is selected from the group consisting of polyol esters, polyalkylene glycols and polyvinyl ethers.

The present invention is further directed to methods for dissolving residual non-oxygenated lubricant in a fluorocarbon and oxygenated lubricant refrigerant composition in a compression refrigeration system. The non-oxygenated lubricant is residual because it remains in the refrigeration system following retrofit of said system from a first refrigerant composition comprising a chlorofluorocarbon and/or hydrochlorofluorocarbon and a non-oxygenated lubricant to a second refrigerant composition comprising a fluorocarbon and an oxygenated lubricant. The above method for dissolving comprises adding a compatibilizer to said system, wherein said non-oxygenated lubricant is selected from the group consisting of paraffins, napthenes, aromatics and poly-α-olefins; and said oxygenated lubricant is selected from the group consisting of polyol esters, polyalkylene glycols and polyvinyl ethers.

DETAILED DESCRIPTION

The present inventor discovered that using an effective amount of the present compatibilizers in a compression refrigeration system containing residual non-oxygenated conventional lubricant following retrofit, results in efficient solubilization of the residual non-oxygenated conventional lubricant in the fluorocarbon and an oxygenated lubricant composition. The compatibilizers travel throughout a compression refrigeration system mixed with refrigerant and with lubricant that escapes the compressor. Use of compatibilizers results in the increase in solubility of residual non-oxygenated conventional lubricant in the fluorocarbon and an oxygenated lubricant composition, thereby enabling return of the non-oxygenated lubricant from the evaporator to the compressor as well as dilution of the residual non-oxygenated lubricant in the fluorocarbon and an oxygenated lubricant composition.

By controlling the ratio of carbon to polar groups (e.g. ether, carbonyl, nitrile, halogen) in the compatibilizer, the inventor discovered that the polar-group-containing compatibilizer could surprisingly increase the solubility of residual non-oxygenated conventional lubricant in a hydrofluorocarbon and oxygenated lubricant composition. This results in the non-oxygenated lubricant remaining miscible with the hydrofluorocarbon and an oxygenated lubricant composition in the coldest sections of compression refrigeration apparatus. Without wishing to be bound by theory, the polar functional groups in the present compatibilizers are attracted to the relatively polar hydrofluorocarbon and oxygenated lubricant while the hydrocarbon portion of the compatibilizer is miscible with the non-oxygenated lubricant. Use of the present compatibilizers causes an increase in the solubility of residual non-oxygenated conventional lubricant in the fluorocarbon and oxygenated lubricant composition and results in efficient return of all lubricant from a non-compressor zone to a compressor zone in a compression refrigeration system. Reducing the amount of all lubricants in the evaporator zone also improves heat transfer of the refrigerant, and likewise, improves refrigerating capacity and efficiency of a system. Thus, the present compatibilizers allow for retrofit of a compression refrigeration system to relatively polar hydrofluorocarbon (or other fluorocarbon refrigerant) and an oxygenated lubricant compositions without flushing residual non-oxygenated conventional lubricant.

The increased solubility of residual non-oxygenated lubricant in fluorocarbon and oxygenated lubricant compositions further allows liquid refrigerant to dissolve and carry residual non-oxygenated lubricant out of the condenser, which improves lubricant return and heat transfer in the condenser and further improves capacity and efficiency of the refrigeration system.

In the present refrigerant composition comprising lubricant and compatibilizer, from about 0.1 to about 50 weight percent, preferably from about 1 to about 30 weight percent, and most preferably from about 5 to about 15 weight percent of the combined lubricant and compatibilizer composition is compatibilizer. Compatibilizer may be charged to a compression refrigeration system in a number of ways. For example, compatabilizer may be charged by direct injection of neat compatibilizer into a system; premixed with oxygenated lubricant; premixed with hydrofluorocarbon refrigerant; and/or preloaded into a filter dryer or other system component. An effective amount of compatibilizer in the present compositions and methods leads to residual non-oxygenated lubricant, resulting from system retrofit without flushing, becoming solubilized in the hydrofluorocarbon and oxygenated lubricant composition to the extent that adequate return of all lubricant in a compression refrigeration system from non-compressor zones (e.g. evaporator or condenser) to the compressor zone is obtained.

Chlorofluorocarbon refrigerants of the present invention are those conventional refrigerants consisting essentially of the elements chlorine, fluorine and carbon, for example, CFC-11 ($CFCl_3$) and CFC-12 ($CF_2Cl_2$). Hydrochlorofluorocarbon refrigerants of the present invention are those interim, alternate CFC-replacement refrigerants consisting essentially of the elements hydrogen, chlorine, fluorine and carbon, for example, HCFC-22 ($CHClF_2$) and HCFC-124 ($CHClFCF_3$). Additionally, mixtures of chlorofluorocarbons and/or hydrochlorofluorocarbons, e.g. CFC-115 ($CF_3CF_2Cl$)/HCFC-22 ($CHF_2Cl$) (known by the ASHRAE designation R-502), are included as refrigerants in the first compositions of the present invention.

Fluorocarbon refrigerants of the present invention contain at least one carbon atom and one fluorine atom. Of particular utility are fluorocarbons having 1–6 carbon atoms containing at least one fluorine atom, optionally containing oxygen atoms, and having a normal boiling point of from −90° C. to 80° C. These fluorocarbons may be represented by the general formula $C_xF_{2x+2-y}H_yO_z$, wherein x is 1–6, y is 0–9, and z is 0–2. Preferred of the fluorocarbons are those in which x is 1–6, y is 1–5 and z is 0–1. Fluorocarbons are commercial products available from a number of sources such as E. I. du Pont de Nemours & Co., Fluoroproducts, Wilmington, Del., 19898, USA, and additionally by synthetic processes disclosed in art such as Chemistry of Organic Fluorine Compounds, edited by Milos Hudlicky, published by The MacMillan Company, New York, N.Y., 1962. Representative fluorocarbons include: $CHF_3$ (HFC-23), $CH_2F_2$ (HFC-32), $CH_3F$ (HFC-41), $CF_3CF_3$ (PFC-116), $CHF_2CF_3$ (HFC-125), $CHF_2CHF_2$ (HFC-134), $CH_2FCF_3$ (HFC-134a), $CHF_2CH_2F$ (HFC143), $CF_3CH_3$ (HFC-143a), $CHF_2CH_3$ (HFC-152a), $CF_3CF_2CF_3$ (PFC-218), $CHF_2CF_2CF3$ (HFC-227ca), $CF_3CFHCF_3$ (HFC-227ea), $CHF_2CF_2CHF_2$ (HFC-236ca), $CH_2FCF_2CF_3$ (HFC-236cb), $CHF_2CHFCF_3$ (HFC-236ea), $CF_3CH_2CF_3$ (HFC-236fa), $CH_2FCF_2CHF_2$ (HFC-245ca), $CH_3CF_2CF_3$ (HFC-245cb), $CHF_2CHFCHF_2$ (HFC-245ea), $CH_2FCHFCF_3$ (HFC-245eb), $CHF_2CH_2CF_3$ (HFC-245fa), $CH_2FCF_2CH_2F$ (HFC-254ca), $CH_2CF_2CHF_2$ (HFC-254cb), $CH_2FCHFCHF_2$ (HFC-254ea), $CH_3CHFCF_3$ (HFC-254eb), $CHF_2CH_2CHF_2$ (HFC-254fa), $CH_2FCH_2CF_3$ (HFC-254fb), $CH_3CF_2CH_3$ (HFC-272ca), $CH_3CHFCH_2F$ (HFC-272ea), $CH_2FCH_2CH_2F$ (HFC-272fa), $CH_3CH_2CF_2H$(HFC-272fb), $CH_3CHFCH_3$ (HFC-281ea), $CH_3CH_2CH_2F$ (HFC-281fa), cyclo-$C_4F_8$ (PFC-C318), $CHF_2CF_2CF_2CF_2H$(HFC-338 pcc), $CF_3CHFCHFCF_2CF_3$ (HFC-43-10mee), $C_4F_9OCH_3$, and $C_4F_9OC_2H_5$.

The present invention is particularly useful with azeotropic and azeotrope-like fluorocarbon refrigerant compositions, such as, HFC-125/HFC-143a/HFC-134a (known by the ASHRAE designation R-404A), HFC-32/HFC125/HFC-134a (known by ASHRAE designations R-407A, R-407B, and R407C), HFC-32/HFC-125 (R-410A), and HFC-125/HFC-143a (known by the ASHRAE designation R-507).

The fluorocarbons of the present invention may optionally further comprise up to 10 weight percent of dimethyl ether, or at least one $C_3$ to $C_5$ hydrocarbon, e.g., propane, propylene, cyclopropane, n-butane, i-butane, n-pentane, cyclopentane, isopentane (2-methylbutane) and neopentane (2,2-dimethylpropane). Examples of fluorocarbons containing such $C_3$ to $C_5$ hydrocarbons are azeotrope-like compositions of HFC-125/HFC-134a/n-butane (known by the ASHRAE designation R-417A).

Lubricants of the present invention are selected by considering a given compressor's requirements and the environment to which the lubricant will be exposed. Lubricants of the present invention preferably have a kinematic viscosity of at least about 15 centistokes at 40° C.

Non-oxygenated conventional lubricants of the present invention are those conventionally used in compression refrigeration apparatus utilizing chlorofluorocarbon and/or hydrochlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21, herein incorporated by reference. Non-oxygenated lubricants of the present invention comprise those commonly known as "mineral oils" in the field of compression refrigeration lubrication. Mineral oils comprise paraffins (i.e. straight chain and branched-carbon-chain, saturated hydrocarbons), naphthenes (i.e. cyclic paraffins) and aromatics (i.e. unsaturated, cyclic hydrocarbons containing one or more rings characterized by alternating double bonds). Non-oxygenated lubricants of the present invention further comprise those commonly known as "synthetic oils" in the field of compression refrigeration lubrication. Synthetic oils comprise alkylaryls (i.e. linear and branched alkyl alkylbenzenes), synthetic paraffins and napthenes, and poly(alpha-olefins). Representative non-oxygenated lubricants of the present invention are the commercially available BVM 100 N (paraffinic mineral oil sold by BVA Oils), Suniso® 3GS (napthenic mineral oil sold by Crompton Co.), Sontex® 372LT (napthenic mineral oil sold by Pennzoil), Calumet® RO-30 (napthenic mineral oil sold by Calument Lubricants), Zerol® 75 and Zerol® 150 (linear alkylbenzenes sold by Shrieve Chemicals) and HAB 22 (branched alkylbenzene sold by Nippon Oil).

Oxygenated lubricants of the present invention are those which have been designed for use with hydrofluorocarbon refrigerants and are miscible with hydrofluorocarbons under compression refrigeration system operating conditions. Such lubricants and their properties are discussed in "Refrigeration lubricants—current practice and future development" by G. Short, T. Rajewski and J. Oberle of CPI Engineering Services, Midland, Mich., USA in Proceedings of the International Refrigeration Conference at Purdue, 6th, West Lafayette, Ind., Jul. 23–26, 1996 (1996), 265–271, editors J. Braun and E. Groll and published by Purdue University, West Lafayette, Ind. Oxygenated lubricants include, but are not limited to, polyol esters, polyalkylene glycols, and polyvinyl ethers.

Compatibilizers of the present invention comprise polyoxyalkylene glycol ethers represented by the formula $R^1[(OR^2)_xOR^3]_y$, wherein: x is selected from integers from 1–3; y is selected from integers from 1–4; $R^1$ is selected from hydrogen and aliphatic hydrocarbon radicals having 1 to 6 carbon atoms and y bonding sites; $R^2$ is selected from aliphatic hydrocarbylene radicals having from 2 to 4 carbon atoms; $R^3$ is selected from hydrogen and aliphatic and alicyclic hydrocarbon radicals having from 1 to 6 carbon atoms; at least one of $R^1$ and $R^3$ is said hydrocarbon radical; and wherein said polyoxyalkylene glycol ethers have a molecular weight of from about 100 to about 300 atomic mass units and a carbon to oxygen ratio of from about 2.3 to about 5.0.

In the present polyoxyalkylene glycol ether compatibilizers represented by $R^1[(OR^2) OR^3]_y$: x is preferably 1–2; y is preferably 1; $R^1$ and $R^3$ are preferably independently selected from hydrogen and aliphatic hydrocarbon radicals having 1 to 4 carbon atoms; $R^2$ is preferably selected from aliphatic hydrocarbylene radicals having from 2 or 3 carbon atoms, most preferably 3 carbon atoms; the polyoxyalkylene glycol ether molecular weight is preferably from about 100 to about 250 atomic mass units, most preferably from about 125 to about 250 atomic mass units; and the polyoxyalkylene glycol ether carbon to oxygen ratio is preferably from about 2.5 to 4.0, most preferably from about 2.7 to about 3.5. The $R^1$ and $R^3$ hydrocarbon radicals having 1 to 6 carbon atoms may be linear, branched or cyclic.

Representative $R^1$ and $R^3$ hydrocarbon radicals include methyl, ethyl, propyl, isopropyl, butyl, isobutyl, sec-butyl, tert-butyl, pentyl, isopentyl, neopentyl, tert-pentyl, cyclopentyl, and cyclohexyl. When free hydroxyl radicals of the present polyoxyalkylene glycol ether compatibilizers may be incompatible with certain compression refrigeration apparatus materials of construction (e.g. Mylar®), $R^1$ and $R^3$ are preferably aliphatic hydrocarbon radicals having 1 to 4 carbon atoms, most preferably 1 carbon atom. The $R^2$ aliphatic hydrocarbylene radicals having from 2 to 4 carbon atoms form repeating oxyalkylene radicals—$(OR^2)_x$—that include oxyethylene radicals, oxypropylene radicals, and oxybutylene radicals. The oxyalkylene radical comprising $R^2$ in one polyoxyalkylene glycol ether compatibilizer molecule may be the same or one molecule may contain different R oxyalkylene groups. The present polyoxyalkylene glycol ether compatibilizers preferably comprise at least one oxypropylene radical. Where $R^1$ is an aliphatic or alicyclic hydrocarbon radical having 1 to 6 carbon atoms and y bonding sites, the radical may be linear, branched or cyclic. Representative $R^1$ aliphatic hydrocarbon radicals having two bonding sites include, for example, an ethylene radical, a propylene radical, a butylene radical, a pentylene radical, a hexylene radical, a cyclopentylene radical and a cyclohexylene radical. Representative $R^1$ aliphatic hydrocarbon radicals having three or four bonding sites include residues derived from polyalcohols, such as trimethylolpropane, glycerin, pentaerythritol, 1,2,3-trihydroxycyclohexane and 1,3,5-trihydroxycyclohexane, by removing their hydroxyl radicals.

Representative polyoxyalkylene glycol ether compatibilizers include: $CH_3OCH_2CH(CH_3)O(H$ or $CH_3)$ (propylene glycol methyl (or dimethyl) ether), $CH_3O[CH_2CH(CH_3)O]_2$ (H or $CH_3$) (dipropylene glycol methyl (or dimethyl) ether), $CH_3O[CH_2CH(CH_3)O]_3(H$ or $CH_3)$ (tripropylene glycol methyl (or dimethyl) ether), $C_2H_5OCH_2CH(CH_3)O(H$ or $C_2H_5)$ (propylene glycol ethyl (or diethyl) ether), $C_2H_5O[CH_2CH(CH_3)O]_2(H$ or $C_2H_5)$ (dipropylene glycol ethyl (or diethyl) ether), $C_2H_5O[CH_2CH(CH_3)O]_3(H$ or $C_2H_5)$ (tripropylene glycol ethyl (or diethyl) ether), $C_3H_7OCH_2CH(CH_3)O(H$ or $C_3H_7)$ (propylene glycol n-propyl (or di-n-propyl) ether), $C_3H_7O[CH_2CH(CH_3)O]_2(H$ or $C_3H_7)$ (dipropylene glycol n-propyl (or di-n-propyl) ether), $C_3H_7O[CH_2CH(CH_3)O]_3(H$ or $C_3H_7)$ (tripropylene glycol n-propyl (or di-n-propyl) ether), $C_4H_9OCH_2CH(CH_3)OH$ (propylene glycol n-butyl ether), $C_4H_9O[CH_2CH(CH_3)O]_2(H$ or $C_4H_9)$ (dipropylene glycol n-butyl (or di-n-butyl) ether), $C_4H_9O[CH_2CH(CH_3)O]_3(H$ or $C_4H_9)$ (tripropylene glycol n-butyl (or di-n-butyl) ether), $(CH_3)_3COCH_2CH(CH_3)OH$ (propylene glycol t-butyl ether), $(CH_3)_3CO[CH_2CH(CH_3)O]_2(H$ or $(CH_3)_3)$ (dipropylene glycol t-butyl (or di-t-butyl) ether), $(CH_3)_3CO[CH_2CH(CH_3)O]_3(H$ or $(CH_3)_3)$ (tripropylene glycol t-butyl (or di-t-butyl) ether), $C_5H_{11}OCH_2CH(CH_3)OH$ (propylene glycol n-pentyl ether), $C_4H_9OCH_2CH(C_2H_5)OH$ (butylene glycol n-butyl ether), $C_4H_9O[CH_2CH(C_2H_5)O]_2H$ (dibutylene glycol n-butyl ether), trimethylolpropane tri-n-butyl ether ($C_2H_5C(CH_2O(CH_2)_3CH_3)_3$) and trimethylolpropane di-n-butyl ether ($C_2H_5C(CH_2OC(CH_2)_3CH_3)_2CH_2OH$)

Compatibilizers of the present invention further comprise amides represented by the formulae $R^1CONR^2R^3$ and cyclo-$[R^4CON(R^5)$-$]$, wherein $R^1$, $R^2$, $R^3$ and $R^5$ are independently selected from aliphatic and alicyclic hydrocarbon radicals having from 1 to 12 carbon atoms, and at most one aromatic radical having from 6 to 12 carbon atoms; $R^4$ is selected from aliphatic hydrocarbylene radicals having from 3 to 12 carbon atoms; and wherein said amides have a molecular weight of from about 120 to about 300 atomic mass units and a carbon to oxygen ratio of from about 7 to about 20. The molecular weight of said amides is preferably from about 160 to about 250 atomic mass units. The carbon to oxygen ratio of said amides is preferably from about 7 to about 16, and most preferably from about 10 to about 14. $R^1$, $R^2$, $R^3$ and $R^5$ may optionally include substituted radicals, that is, radicals containing non-hydrocarbon substituents selected from halogens (e.g., fluorine, chlorine) and alkoxides (e.g. methoxy). $R^1$, $R^2$, $R^3$ and $R^5$ may optionally include heteroatom-substituted radicals, that is, radicals, which contain the atoms nitrogen (aza-), oxygen (oxa-) or sulfur (thia-) in a radical chain otherwise composed of carbon atoms. In general, no more than three non-hydrocarbon substituents and heteroatoms, and preferably no more than one, will be present for each 10 carbon atoms in $R^{1-3}$ and $R^5$, and the presence of any such non-hydrocarbon substituents and heteroatoms must be considered in applying the aforementioned ratio of carbon to oxygen and molecular weight limitations.

Preferred amide compatibilizers consist of carbon, hydrogen, nitrogen and oxygen. Representative $R^1$, $R^2$, $R^3$ and $R^4$ aliphatic and alicyclic hydrocarbon radicals include methyl, ethyl, propyl, isopropyl, butyl, isobutyl, sec-butyl, tert-butyl, pentyl, isopentyl, neopentyl, tert-pentyl, cyclopentyl, cyclohexyl, heptyl, octyl, nonyl, decyl, undecyl, dodecyl and their configurational isomers. Representative $R^1$, $R^2$, $R^3$ and $R^5$ aromatic radicals include phenyl, cumenyl, mesityl, tolyl, xylyl, benzyl, phenethyl, thienyl, furyl, pyrrolyl and pyridyl. A preferred embodiment of amide compatibilizers are those wherein $R^4$ in the aforementioned formula cyclo-[$R^4CON(R^5)$-] may be represented by the hydrocarbylene radical ($CR^6R^7$), in other words, the formula: cyclo-[$(CR^6R^7)_nCON(R^5)$—] wherein: the previously-stated values for (a) ratio of carbon to oxygen and (b) molecular weight apply; n is an integer from 3 to 5; $R^5$ is a saturated hydrocarbon radical containing 1 to 12 carbon atoms; $R^6$ and $R^7$ are independently selected (for each n) by the rules previously offered defining $R^{1-3}$. In the lactams represented by the formula: cyclo-[$(CR^6R^7)_nCON(R^5)$—], all $R^6$ and $R^7$ are preferably hydrogen, or contain a single saturated hydrocarbon radical among the n methylene units, and $R^5$ is a saturated hydrocarbon radical containing 3 to 12 carbon atoms. For example, 1-(saturated hydrocarbon radical)-5-methylpyrrolidin-2-ones.

Representative amide compatibilizers include: 1-octylpyrrolidin-2-one, 1-decylpyrrolidin-2-one, 1-octyl-5-methylpyrrolidin-2-one, 1-butylcaprolactam, 1-isobutylcaprolactam, 1-cyclohexylpyrrolidin-2-one, 1-cyclohexyl-5-methylpyrrolidin-2-one, 1-butyl-5-methylpiperid-2-one, 1-pentyl-5methylpiperid-2-one, 1-hexylcaprolactam, 1-hexyl-5-methylpyrrolidin-2-one, 1-heptyl-5-methylpyrrolidin-2-one, 1-nonyl-5-methylpyrrolidin-2-one, 1-undecyl-5-methylpyrrolidin-2-one, 1-dodecyl-5-methylpyrrolidin-2-one, 5-methyl-1-pentylpiperid-2-one, 1,3-dimethylpiperid-2-one, 1-methylcaprolactam, 1-butylpyrrolidin-2-one, 1,5-dimethylpiperid-2-one, 1-decyl-5-methylpyrrolidin-2-one, 1-dodecylpyrrolid-2-one, N,N-dibutylformamide and N,N-diisopropylacetamide.

Compatibilizers of the present invention further comprise ketones represented by the formula $R^1COR^2$, wherein $R^1$ and $R^2$ are independently selected from aliphatic, alicyclic and aryl hydrocarbon radicals having from 1 to 12 carbon atoms, and wherein said ketones have a molecular weight of from about 70 to about 300 atomic mass units and a carbon to oxygen ratio of from about 4 to about 13. $R^1$ and $R^2$ in said ketones are preferably independently selected from aliphatic and alicyclic hydrocarbon radicals having 1 to 9 carbon atoms. The molecular weight of said ketones is preferably from about 100 to 200 atomic mass units. The carbon to oxygen ratio in said ketones is preferably from about 7 to about 10. $R^1$ and $R^2$ may together form a hydrocarbylene radical connected and forming a five, six, or seven-membered ring cyclic ketone, for example, cyclopentanone, cyclohexanone, and cycloheptanone. $R^1$ and $R^2$ may optionally include substituted hydrocarbon radicals, that is, radicals containing non-hydrocarbon substituents selected from halogens (e.g., fluorine, chlorine) and alkoxides (e.g. methoxy). $R^1$ and $R^2$ may optionally include heteroatom-substituted hydrocarbon radicals, that is, radicals, which contain the atoms nitrogen (aza-), oxygen (keto-, oxa-) or sulfur (thia-) in a radical chain otherwise composed of carbon atoms. In general, no more than three non-hydrocarbon substituents and heteroatoms, and preferably no more than one, will be present for each 10 carbon atoms in $R^1$ and $R^2$, and the presence of any such non-hydrocarbon substituents and heteroatoms must be considered in applying the aforementioned ratio of carbon to oxygen and molecular weight limitations. Representative $R^1$ and $R^2$ aliphatic, alicyclic and aryl hydrocarbon radicals in the general formula $R^1COR^2$ include methyl, ethyl, propyl, isopropyl, butyl, isobutyl, sec-butyl, tert-butyl, pentyl, isopentyl, neopentyl, tert-pentyl, cyclopentyl, cyclohexyl, heptyl, octyl, nonyl, decyl, undecyl, dodecyl and their configurational isomers, as well as phenyl, benzyl, cumenyl, mesityl, tolyl, xylyl and phenethyl.

Representative ketone compatibilizers include: 2-butanone, 2-pentanone, acetophenone, butyrophenone, hexanophenone, cyclohexanone, cycloheptanone, 2-heptanone, 3-heptanone, 5-methyl-2-hexanone, 2-octanone, 3-octanone, diisobutyl ketone, 4-ethylcyclohexanone, 2-nonanone, 5-nonanone, 2-decanone, 4-decanone, 2-decalone, 2-tridecanone, dihexyl ketone and dicyclohexyl ketone.

Compatibilizers of the present invention further comprise nitriles represented by the formula $R^1CN$, wherein $R^1$ is selected from aliphatic, alicyclic or aryl hydrocarbon radicals having from 5 to 12 carbon atoms, and wherein said nitriles have a molecular weight of from about 90 to about 200 atomic mass units and a carbon to nitrogen ratio of from about 6 to about 12. $R^1$ in said nitrile compatibilizers is preferably selected from aliphatic and alicyclic hydrocarbon radicals having 8 to 10 carbon atoms. The molecular weight of said nitrile compatibilizers is preferably from about 120 to about 140 atomic mass units. The carbon to nitrogen ratio in said nitrile compatibilizers is preferably from about 8 to about 9. $R^1$ may optionally include substituted hydrocarbon radicals, that is, radicals containing non-hydrocarbon substituents selected from halogens (e.g., fluorine, chlorine) and alkoxides (e.g. methoxy). $R^1$ may optionally include heteroatom-substituted hydrocarbon radicals, that is, radicals, which contain the atoms nitrogen (aza-), oxygen (keto-, oxa-) or sulfur (thia-) in a radical chain otherwise composed of carbon atoms. In general, no more than three non-hydrocarbon substituents and heteroatoms, and preferably no more than one, will be present for each 10 carbon atoms in $R^1$, and the presence of any such non-hydrocarbon substituents and heteroatoms must be considered in applying the aforementioned ratio of carbon to nitrogen and molecular weight limitations. Representative $R^1$ aliphatic, alicyclic and aryl hydrocarbon radicals in the general formula $R^1CN$ include pentyl, isopentyl, neopentyl, tert-pentyl, cyclopentyl, cyclohexyl, heptyl, octyl, nonyl, decyl, undecyl, dodecyl and their configurational isomers, as well as phenyl, benzyl, cumenyl, mesityl, tolyl, xylyl and phenethyl.

Representative nitrile compatibilizers include: 1-cyanopentane, 2,2-dimethyl-4-cyanopentane, 1-cyanohexane, 1-cyanoheptane, 1-cyanooctane, 2-cyanooctane, 1-cyanononane, 1-cyanodecane, 2-cyanodecane, 1-cyanoundecane and 1-cyanododecane. Nitrile compatibilizers are especially useful in compatibilizing HFC refrigerants with aromatic and alkylaryl lubricants.

Compatibilizers of the present invention further comprise chlorocarbons represented by the formula $RCl_x$, wherein; x is selected from the integers 1 or 2; R is selected from aliphatic and alicyclic hydrocarbon radicals having 1 to 12 carbon atoms; and wherein said chlorocarbons have a molecular weight of from about 100 to about 200 atomic mass units and carbon to chlorine ratio from about 2 to about 10. The molecular weight of said chlorocarbon compatibilizers is preferably from about 120 to 150 atomic mass units. The carbon to chlorine ratio in said chlorocarbon compatibilizers is preferably from about 6 to about 7. Representative R aliphatic and alicyclic hydrocarbon radicals in the general formula $RCl_x$ include methyl, ethyl, propyl, isopropyl, butyl, isobutyl, sec-butyl, tert-butyl, pentyl, isopentyl, neopentyl, tert-pentyl, cyclopentyl, cyclohexyl, heptyl, octyl, nonyl, decyl, undecyl, dodecyl and their configurational isomers. Representative chlorocarbon compatibilizers include: 3-(chloromethyl)pentane, 3-chloro-3-methylpentane, 1-chlorohexane, 1,6-dichlorohexane, 1-chloroheptane, 1-chlorooctane, 1-chlorononane, 1-chlorodecane, and 1,1,1-trichlorodecane.

Compatibilizers of the present invention further comprise aryl ethers represented by the formula $R^1OR^2$, wherein: $R^1$ is selected from aryl hydrocarbon radicals having from 6 to 12 carbon atoms; $R^2$ is selected from aliphatic hydrocarbon radicals having from 1 to 4 carbon atoms; and wherein said aryl ethers have a molecular weight of from about 100 to about 150 atomic mass units and a carbon to oxygen ratio of from about 4 to about 20. The carbon to oxygen ratio in said aryl ether compatibilizers is preferably from about 7 to about 10. Representative $R^1$ aryl radicals in the general formula $R^1OR^2$ include phenyl, biphenyl, cumenyl, mesityl, tolyl, xylyl, naphthyl and pyridyl. Representative $R^2$ aliphatic hydrocarbon radicals in the general formula $R^1OR^2$ include methyl, ethyl, propyl, isopropyl, butyl, isobutyl, sec-butyl and tert-butyl. Representative aromatic ether compatibilizers include: methyl phenyl ether (anisole), 1,3-dimethoxybenzene, ethyl phenyl ether and butyl phenyl ether.

Compatibilizers of the present invention further comprise 1,1,1-trifluoroalkanes represented by the general formula $CF_3R^1$, wherein $R^1$ is selected from aliphatic and alicyclic hydrocarbon radicals having from about 5 to about 15 carbon atoms, preferably primary, linear, saturated, alkyl radicals. Representative 1,1,1-trifluoroalkane compatibilizers include: 1,1,1-trifluorohexane and 1,1,1-trifluorododecane.

Compatibilizers of the present invention further comprise fluoroethers represented by the general formula $R^1OCF_2CF_2H$, wherein $R^1$ is selected from aliphatic and alicyclic hydrocarbon radicals having from about 5 to about 15 carbon atoms, preferably primary, linear, saturated, alkyl radicals. Representative fluoroether compatibilizers include: $C_8H_{17}OCF_2CF_2H$ and $C_6H_{13}OCF_2CF_2H$.

Compatibilizers of the present invention may comprise a single compatibilizer species or multiple compatibilizer species together in any proportion. For example, a compatibilizer may comprise a mixture of compounds from within a single compatibilizer species (e.g. a mixture of polyoxyalkylene glycol ethers) or a mixture of compounds chosen from different compatibilizer species (e.g. a mixture of a polyoxyalkylene glycol ether with a ketone).

Compatibilizers of the present invention may optionally further comprise from about 0.5 to about 50 weight percent (based on total amount of compatibilizer) of a linear or cyclic aliphatic or aromatic hydrocarbon containing from 5 to 15 carbon atoms. Representative hydrocarbons include pentane, hexane, octane, nonane, decane, Isopar® H (a high purity $C_{11}$ to $C_{12}$ iso-paraffinic), Aromatic 150 (a $C_9$ to $C_{11}$ aromatic), Aromatic 200 (a $C_9$ to $C_{15}$ aromatic) and Naptha 140. All of these hydrocarbons are sold by Exxon Chemical, USA.

Compatibilizers of the present invention may optionally further comprise a polymeric additive. The polymeric additive may be a random copolymer of fluorinated and non-fluorinated acrylates, wherein the polymer comprises repeating units of at least one monomer represented by the formulae $CH_2=C(R^1)CO_2R^2$, $CH_2=C(R^3)C_6H_4R^4$, and $CH_2=C(R^5)C_6H_4XR^6$, wherein X is oxygen or sulfur; $R^1$, $R^3$, and $R^5$ are independently selected from the group consisting of H and $C_1-C_4$ alkyl radicals; and $R^2$, $R^4$, and $R^6$ are independently selected from the group consisting of carbon-chain-based radicals containing C, and F, and may further contain H, Cl, ether oxygen, or sulfur in the form of thioether, sulfoxide, or sulfone groups. Examples of such polymeric additives include those disclosed in U.S. Pat. No. 6,299,792, such as Zonyl® PHS sold by E. I. du Pont de Nemours & Co., Wilmington, Del., 19898, USA. Zonyl® PHS is a random copolymer made by polymerizing 40 weight percent $CH_2=C(CH_3)CO_2CH_2CH_2(CF_2CF_2)_mF$ (also referred to as Zonyl® fluoromethacrylate or ZFM) wherein m is from 1 to 12, primarily 2 to 8, and 60 weight percent lauryl methacrylate $(CH_2=C(CH_3)CO_2(CH_2)_{11}CH_3$, also referred to as LMA).

Compatibilizers of the present invention may optionally further contain from about 0.01 to 30 weight percent (based on total amount of compatibilizer) of an additive which reduces the surface energy of metallic copper, aluminum, steel, or other metals found in heat exchangers in a way that reduces the adhesion of lubricants to the metal. Examples of metal surface energy reducing additives include those disclosed in WIPO PCT publication WO 96/7721, such as Zonyl® FSA, Zonyl® FSP, Zonyl® FSJ and Zonyl® FS62, all products of E. I. du Pont de Nemours and Co. In practice, by reducing the adhesive forces between the metal and the lubricant (i.e. substituting for a compound more tightly bound to the metal), the lubricant circulates more freely through the heat exchangers and connecting tubing in an air conditioning or refrigeration system, instead of remaining as a layer on the surface of the metal. This allows for the increase of heat transfer to the metal and allows efficient return of lubricant to the compressor.

Commonly used refrigeration system additives may optionally be added, as desired, to compositions of the present invention in order to enhance lubricity and system stability. These additives are generally known within the field of refrigeration compressor lubrication, and include anti wear agents, extreme pressure lubricants, corrosion and oxidation inhibitors, metal surface deactivators, free radical scavengers, foaming and antifoam control agents, leak detectants and the like. In general, these additives are present only in small amounts relative to the overall lubricant composition. They are typically used at concentrations of from less than about 0.1% to as much as about 3% of each additive. These additives are selected on the basis of the individual system requirements. Some typical examples of such additives may include, but are not limited to, lubrication enhancing additives, such as alkyl or aryl esters of phosphoric acid and of thiophosphates. These include members of the triaryl phosphate family of EP lubricity additives, such as butylated triphenyl phosphates (BTPP), or other alkylated triaryl phosphate esters, e.g. Syn-O-Ad 8478 from Akzo Chemicals, tricrecyl phosphates and related compounds. Additionally, the metal dialkyl dithiophosphates (e.g. zinc dialkyl dithiophosphate or ZDDP, Lubrizol 1375) and other members of this family of chemicals may be used in compositions of the present invention. Other antiwear additives include natural product oils and asymmetrical polyhydroxyl lubrication additives such as Synergol TMS (International Lubricants). Similarly, stabilizers such as anti oxidants, free radical scavengers, and water scavengers may be employed. Compounds in this category can include, but are not limited to, butylated hydroxy toluene (BHT) and epoxides.

Compatiblizers such as ketones may have an objectionable odor, which can be masked by addition of an odor masking agent or fragrance. Typical examples of odor masking agents or fragrances may include Evergreen, Fresh Lemon, Cherry, Cinnamon, Peppermint, Floral or Orange Peel or sold by Intercontinental Fragrance, as well as d-limonene and pinene. Such odor masking agents may be used at concentrations of from about 0.001% to as much as about 15% by weight based on the combined weight of odor masking agent and compatibilizer.

The present invention further comprises processes for producing refrigeration comprising evaporating the present refrigeration compositions in the vicinity of a body to be cooled, and processes for producing heat comprising condensing hydrofluorocarbon refrigerant in the presence of lubricant and compatibilizer in the presence of a body to be heated.

EXAMPLES

"POE 22" is used herein as an abbreviation for Mobil Oil product Arctic EAL22, a polyol ester lubricant having a kinematic viscosity of 22 centistokes at 40° C. Suniso® 3GS (herein abbreviated as "3GS") is a napthenic mineral oil with a kinematic viscosity of 33 centistokes at 40° C. sold by Crompton Corporation. Suniso® 4GS (herein abbreviated as "4GS") is a napthenic mineral oil with a kinematic viscosity of 62 centistokes at 40° C. sold by Crompton Corporation. "DMM" used herein is an abbreviation for dipropylene glycol dimethyl ether ($CH_3O[CH_2CH(CH_3)O]_2CH_3$). "OP" used herein is an abbreviation for 1-octyl pyrrolidin-2-one ($C_{12}H_{23}NO$). DMM and OP are all available from Aldrich Chemical Company (Milwaukee, Wis.).

Comparative Example 1

Compatibilizers of the present invention are placed in a suitable container with hydrofluorocarbon refrigerant and lubricant and the temperature lowered until two phases are observed by the naked eye (i.e., the phase separation temperature, also herein referred to as "PST"). The composition in the container 50 wt % HFC-134a (1,1,1,2-tetrafluoroethane) and 50 wt % lubricant/compatibilizer compositions are shown in the below table.

Example 1

Reduction in PST with Addition of Compatibilizers DMM and OP to POE with Residual 3GS

| POE22 wt % | 3GS wt % | DMM wt % | OP wt % | PST (C) | Comment |
|---|---|---|---|---|---|
| COMPARATIVE DATA | | | | | |
| 50 | | | | −38 | PST of POE |
| | 50 | | | 200 | PST of 3GS |
| | | 50 | | −111 | PST of DMM |
| | | | 50 | −187 | PST of OP |
| 47.5 | 2.5 | | | −26 | 5% Residual 3GS in POE |
| 45 | 5 | | | −14 | 10% Residual 3GS in POE |
| EXAMPLE DATA | | | | | |
| 40.5 | 4.5 | 5 | | −24 | 10% Residual 3GS + 11% DMM in POE |
| 40.5 | 4.5 | | 5 | −31 | 10% Residual 3GS + 11% OP in POE |
| 42.3 | 4.7 | | 3 | −25 | 10% Residual 3GS + 7% OP in POE |
| 42.3 | 4.7 | 3 | | −20 | 10% Residual 3GS + 7% DMM in POE |
| 42.8 | 2.2 | | 5 | −42 | 5% Residual 3GS + 10% OP in POE |
| 44.65 | 2.35 | | 3 | −36 | 5% Residual 3GS + 6% OP in POE |
| 44.65 | 2.35 | 3 | | −31 | 5% Residual 3GS + 6% DMM in POE |

Results show that addition of compatibilizers to a lubricant mixture containing POE and residual mineral oil lowers the phase separation temperature and thereby improves miscibility with fluorocarbon refrigerant.

Comparative Example 2

Tests were conducted to determine if compatibilizer could improve performance during a retrofit from R22 and mineral oil to R407C (23 wt % HFC-32 and 25 wt % HFC-125, 52 wt % HFC-134a) and polyol ester (POE) oil. A ductless split R22 Sanyo heat pump (evaporator Model KHSO951, condenser Model CH095 1) was installed in an environmental chamber. The heat pump was outfitted with an R22 Sanyo rotary compressor (C-1R75H2R). The fan-coil unit was installed in the indoor room of an environmental chamber and the outdoor unit was installed in the outdoor room. The system was charged with about 1650 grams of R22 and 365 ml of 4GS mineral oil. Tests were conducted at ASHRAE cooling B conditions where the indoor room was controlled at 80° F. and 50% relative humidity, the outdoor room at 82° F. and 40% relative humidity. Air side capacity, energy efficiency ratio (EER) measurements and oil volume measurements were made. The system was then retrofitted by removing R22 refrigerant and 4GS oil without flushing, then charging the system with 1586 grams R407C and 365 ml Emkarate POE RL68H oil (POE 68). Again, cooling B measurements were made, then the test repeated retrofitting with R407C and 365 ml Emkarate POE RL68H containing 20 wt % n-ocytyl pyrrolidin-2-one. After each test, oil volume removed from the sump was measured to assess oil return. Results are shown in the below table.

Example 2

Cooling Test

| Oil Composition | Sump Oil Volume After Test Test (ml) | Capacity (Kbtu/H) | EER |
|---|---|---|---|
| R22/4GS | 320 | 8.72 | 10.58 |
| R407C/POE 68 | 270 | 8.59 | 9.97 |
| R407C/POE 68 with 20% n-octyl pyrrolidin-2-one and including residual 4GS oil | 310 | 8.59 | 10.05 |

Results show significantly improved oil return, increased energy efficiency and equivalent capacity when compatibilizer is added to POE during a retrofit from R22 and mineral oil to R407C and POE without flushing to remove residual mineral oil.

What is claimed is:

1. A refrigerant composition comprising: (a) at least one fluorocarbon; (b) at least one oxygenated lubricant selected from the group consisting of polyol esters, polyalkylene glycols and polyvinyl ethers; (c) at least one non-oxygenated lubricant selected from the group consisting of paraffins, napthenes, aromatics and poly-α-olefins; and (d) at least one compatibilizer wherein the compatibilizer is at least one amide represented by the formulae $R^1CONR^2R^3$ and cyclo-$[R^4CON(R^5)-]$, wherein $R^1$, $R^2$, $R^3$ and $R^5$ are independently selected from aliphatic and alicyclic hydrocarbon radicals having from 1 to 12 carbon atoms, and at most one aromatic radical having from 6 to 12 carbon atoms; $R^4$ is selected from aliphatic hydrocarbylene radicals having from 3 to 12 carbon atoms; and wherein said amides have a molecular weight of from about 120 to about 300 atomic mass units and a carbon to oxygen ratio of from about 7 to about 20.

2. A method for replacing a first refrigerant composition comprising a chlorofluorocarbon and/or hydrochlorofluorocarbon and at least one non-oxygenated lubricant with a second refrigerant composition comprising at least one fluorocarbon and at least one oxygenated lubricant in a compression refrigeration system without removing residual non-oxygenated lubricant from said system, comprising the steps of: (a) removing essentially all of said first composition from the system; (b) leaving residual non-oxygenated lubricant in said system following said removing; and (c) adding to said system said second composition and at least one compatibilizer, wherein said non-oxygenated lubricant is selected from the group consisting of paraffins, napthenes, aromatics and poly-α-olefins; and said oxygenated lubricant is selected from the group consisting of polyol esters, polyalkylene glycols and polyvinyl ethers.

3. A method, in a compression refrigeration system, for dissolving non-oxygenated lubricant in a refrigerant composition containing at least one fluorocarbon and at least one oxygenated lubricant, said non-oxygenated lubricant remaining in said system following retrofit of said system from a first refrigerant composition comprising a chlorofluorocarbon or hydrochlorofluorocarbon and a non-oxygenated lubricant to a second refrigerant composition comprising at least one fluorocarbon and at least one oxygenated lubricant, comprising the step of: adding at least one compatibilizer to the refrigeration system, wherein said non-oxygenated lubricant is selected from the group consisting of paraffins, napthenes, aromatics and poly-α-olefins; and said oxygenated lubricant is selected from the group consisting of polyol esters, polyalkylene glycols and polyvinyl ethers.

4. The method of claim 2 or 3 wherein the compatibilizer is at least one amide represented by the formulae $R^1CONR^2R^3$ and cyclo-$[R^4CON(R^5)-]$, wherein $R^1$, $R^2$, $R^3$ and $R^5$ are independently selected from aliphatic and alicyclic hydrocarbon radicals having from 1 to 12 carbon atoms, and at most one aromatic radical having from 6 to 12 carbon atoms; $R^4$ is selected from aliphatic hydrocarbylene radicals having from 3 to 12 carbon atoms; and wherein said amides have a molecular weight of from about 120 to about 300 atomic mass units and a carbon to oxygen ratio of from about 7 to about 20.

* * * * *